US012699338B2

(12) United States Patent
Matsumoto et al.

(10) Patent No.: US 12,699,338 B2
(45) Date of Patent: Aug. 4, 2026

(54) DEVELOPER CONTAINER, DEVELOPING DEVICE, PROCESS CARTRIDGE, TONER CONTAINER, SUB-HOPPER, AND IMAGE FORMING APPARATUS WHICH HAVE MULTIPLE PARTITIONS DISPOSED BETWEEN A FIRST HOUSING AND A SECOND HOUSING

(71) Applicants: Kazuki Matsumoto, Kanagawa (JP); Hiroshi Hosokawa, Kanagawa (JP)

(72) Inventors: Kazuki Matsumoto, Kanagawa (JP); Hiroshi Hosokawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/921,022

(22) Filed: Oct. 21, 2024

(65) Prior Publication Data

US 2025/0130518 A1 Apr. 24, 2025

(30) Foreign Application Priority Data

Oct. 24, 2023 (JP) ................................ 2023-182379

(51) Int. Cl.
*G03G 15/08* (2006.01)
*G03G 21/18* (2006.01)

(52) U.S. Cl.
CPC ..... *G03G 15/0891* (2013.01); *G03G 15/0812* (2013.01); *G03G 15/0865* (2013.01); *G03G 21/1814* (2013.01)

(58) Field of Classification Search
CPC ........... G03G 15/0812; G03G 15/0865; G03G 15/0891; G03G 21/1814
See application file for complete search history.

(56) References Cited

U.S. PATENT DOCUMENTS

| | | | |
|---|---|---|---|
| 2006/0115302 A1 | 6/2006 | Hosokawa et al. | |
| 2007/0280725 A1 | 12/2007 | Hosokawa et al. | |
| 2011/0008073 A1 | 1/2011 | Kudo et al. | |
| 2011/0150525 A1 | 6/2011 | Fujiwara et al. | |
| 2013/0322927 A1 | 12/2013 | Matsumoto et al. | |
| 2014/0016960 A1 | 1/2014 | Miyoshi et al. | |

(Continued)

FOREIGN PATENT DOCUMENTS

JP 2005-134725 A 5/2005

*Primary Examiner* — Hoang X Ngo

(74) *Attorney, Agent, or Firm* — XSENSUS LLP

(57) ABSTRACT

A developer container includes a first housing, a rotator drawing a first rotation trajectory in the first housing, a second housing, a developer conveyor in the second housing, and multiple partitions between the first housing and the second housing. The second housing communicates with the first housing. The developer conveyor conveys developer from the second housing to the first housing and includes a rotation shaft and a flexible sheet extending from the rotation shaft. The developer conveyor is rotatable about the rotation shaft to draw an imaginary second rotation trajectory overlapping the first rotation trajectory under an imaginary condition in which the flexible sheet contacts no member and does not bend. The multiple partitions between the first housing and the second housing are arranged at intervals in a rotation shaft direction and are contactable by the flexible sheet rotating around the rotation shaft.

20 Claims, 6 Drawing Sheets

(56) References Cited

U.S. PATENT DOCUMENTS

| | | | | |
|---|---|---|---|---|
| 2015/0261131 | A1* | 9/2015 | Maeshima ........... | G03G 15/556<br>399/27 |
| 2018/0356748 | A1 | 12/2018 | Matsumoto et al. | |
| 2018/0364620 | A1 | 12/2018 | Kubota et al. | |

* cited by examiner

DEVELOPER CONTAINER, DEVELOPING DEVICE, PROCESS CARTRIDGE, TONER CONTAINER, SUB-HOPPER, AND IMAGE FORMING APPARATUS WHICH HAVE MULTIPLE PARTITIONS DISPOSED BETWEEN A FIRST HOUSING AND A SECOND HOUSING

CROSS-REFERENCE TO RELATED APPLICATION

This patent application is based on and claims priority pursuant to 35 U.S.C. § 119(a) to Japanese Patent Application No. 2023-182379, filed on Oct. 24, 2023, in the Japan Patent Office, the entire disclosure of which is hereby incorporated by reference herein.

BACKGROUND

Technical Field

Embodiments of the present disclosure relate to a developer container that stores developer such as toner therein, a developing device, a process cartridge, a toner container, a sub-hopper that include the developer container, and an image forming apparatus.

Related Art

An image forming apparatus such as a copier or a printer in the related art includes a developing device. The developing device includes a developer container having two storage spaces to store developer such as toner.

SUMMARY

This specification describes an improved developer container that includes a first housing, a rotator, a second housing, a developer conveyor, and multiple partitions. The first housing stores developer. The rotator is rotatable to draw a first rotation trajectory in the first housing. The second housing stores the developer and communicates with the first housing. The developer conveyor is in the second housing to convey the developer from the second housing to the first housing. The developer conveyor includes a rotation shaft and a flexible sheet extending from the rotation shaft in a radial direction. The developer conveyor is rotatable about the rotation shaft to draw an imaginary second rotation trajectory. The imaginary second rotation trajectory overlaps at least a part of the first rotation trajectory under an imaginary condition in which the flexible sheet does not contact any member and does not bend. The multiple partitions are disposed between the first housing and the second housing and arranged at intervals in a rotation shaft direction. The multiple partitions are contactable by the flexible sheet rotating around the rotation shaft.

This specification also describes a developing device, a process cartridge, a toner container, a sub-hopper, and an image forming apparatus that include the developer container.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
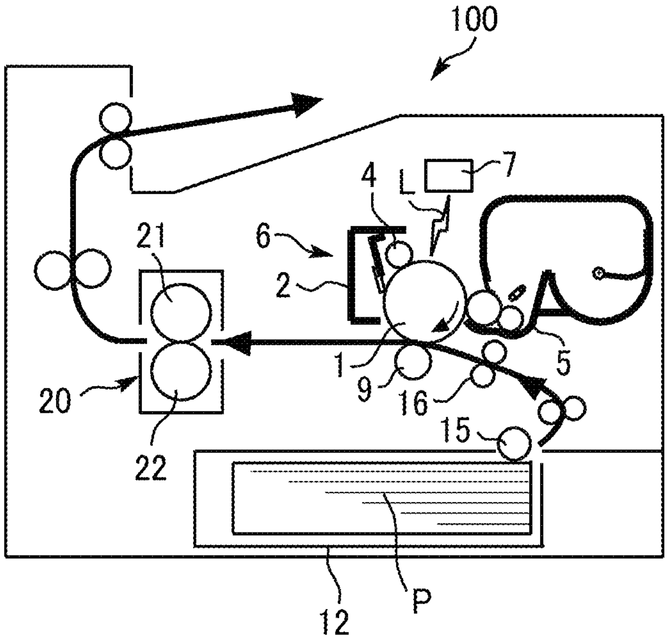
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below in detail with reference to the drawings. Like reference signs are assigned to identical or equivalent components and a description of those components may be simplified or omitted.

With reference to FIG. 1, the configuration and operation of an image forming apparatus 100 are described below.

In FIG. 1, the image forming apparatus 100 such as a printer includes a process cartridge 6, an exposure device 7, a transfer roller 9, a sheet feeder 12, a registration roller pair 16 as a timing roller pair, and a fixing device 20. The process cartridge 6 is configured as a unit including a photoconductor drum 1, a charging roller 4, a developing device 5, and a cleaning device 2. The exposure device 7 irradiates the photoconductor drum 1 with exposure light L that is generated based on image data input from an input device such as a personal computer. A toner image is formed on the photoconductor drum 1. The sheet feeder 12 includes a feed tray to store sheets P. The registration roller pair 16 conveys a sheet P toward a transfer nip where the photoconductor drum 1 and the transfer roller 9 contact each other. The transfer roller 9 transfers the toner image borne on the photoconductor drum 1 onto the sheet P conveyed to the transfer nip (that is, a transfer position). The fixing device 20 fixes the toner image that has not yet been fixed, to the sheet P.

Around the photoconductor 1, the charging roller 4, the developing device 5 including a developer container, and a cleaning device 2 are disposed. These members (the photoconductor drum 1, the charging roller 4, the developing device 5, and the cleaning device 2) are integrated as the process cartridge 6 and are detachably (replaceably) attached to the body of the image forming apparatus 100. The process cartridge 6 is removed from the body of the image forming apparatus 100 and replaced with a new one (or a process cartridge subjected to maintenance) when a predetermined replacement cycle is reached or when maintenance is performed.

With reference to FIG. 1, typical processes of the image forming apparatus 100 are described below.

The input device such as the personal computer sends the image data to the exposure device 7 in the image forming apparatus 100, and the exposure device 7 irradiates the surface of the photoconductor drum 1 with the exposure light (a laser beam) L based on the image data.

A drive motor disposed in the body of the image forming apparatus 100 rotates the photoconductor drum 1 in the direction indicated by the arrow in FIG. 1 (clockwise). Initially, the charging roller 4 uniformly charges the surface of the photoconductor drum 1 at a position at which the surface of the photoconductor drum 1 faces the charging roller 4 (in a charging process). As a result, a charging potential is formed on the surface of the photoconductor drum 1. In the present embodiment, the charging potential on the photoconductor drum 1 is approximately −900 V. Subsequently, the charged surface of the photoconductor drum 1 reaches an irradiation position of the exposure light L. At the irradiation position, the exposure light L is irradiated to a portion of the photoconductor drum 1. An electric potential at the portion changes to a latent image potential (from about 0 V to −100 V), and thus an electrostatic latent image is formed on the surface of the photoconductor drum 1 (in an exposure process).

The surface of the photoconductor drum 1 bearing the electrostatic latent image thereon then reaches a position opposite the developing device 5. The developing device 5 supplies toner onto the photoconductor drum 1, thereby developing the latent image formed on the photoconductor drum 1 into the toner image (in a developing process).

After the developing process, the surface of the photoconductor drum 1 bearing the toner image thereon reaches the transfer nip (that is, the transfer position) formed between the photoconductor drum 1 and the transfer roller 9. In the transfer nip, a transfer bias having a polarity opposite the polarity of the toner is applied from a power source to the transfer roller 9, thereby transferring the toner image formed on the photoconductor drum 1 onto the sheet P conveyed by the registration roller pair 16 (in a transfer process).

The surface of the photoconductor drum 1 after the transfer process reaches a position opposite the cleaning device 2. At the position opposite the cleaning device 2, a cleaning blade 2*a* (see FIG. 2) mechanically removes untransferred toner remaining on the surface of the photoconductor drum 1, and removed toner is collected in the cleaning device 2 (in a cleaning process).

Thus, a series of image forming processes on the photoconductor drum 1 is completed.

The sheet P is conveyed to the transfer nip between the photoconductor drum 1 and the transfer roller 9 as follows.

First, a feed roller 15 feeds the uppermost sheet P of the stack of sheets P stored in the sheet feeder 12 toward a conveyance passage.

Subsequently, the sheet P reaches the registration roller pair 16. The sheet P that has reached the registration roller pair 16 is conveyed to the transfer nip (the contact position of the transfer roller 9 with the photoconductor drum 1) in synchronization with an entry of the toner image formed on the photoconductor drum 1 into the transfer nip.

After the sheet P passes through the transfer nip (i.e., the position of the transfer roller 9) in the transfer process, the sheet P reaches the fixing device 20 through the conveyance passage. In the fixing device 20, the sheet P is interposed between a fixing roller 21 and a pressure roller 22. The toner image is fixed on the sheet P by heat applied from the fixing roller 21 and pressure applied from both of the fixing roller 21 and the pressure roller 22. After the sheet P having the fixed toner image thereon is ejected from the fixing nip formed between the fixing roller 21 and the pressure roller 22, the sheet P is ejected from the body of the image forming apparatus 100 and stacked on an output tray.

Thus, a series of the image forming processes is completed.

Figure 2:
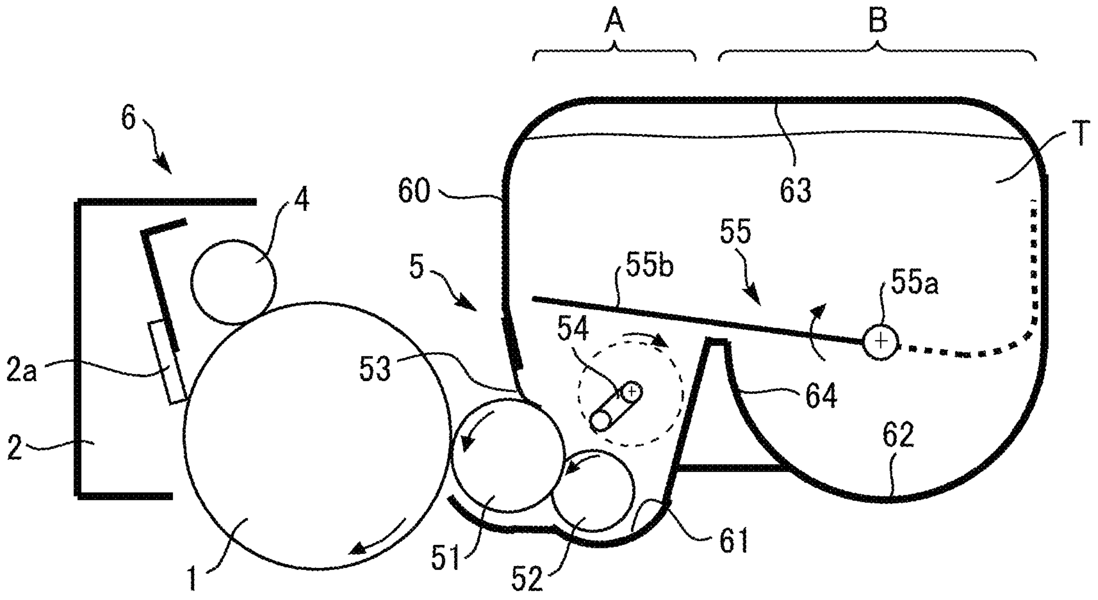
FIG. 2 is a schematic diagram illustrating a configuration of a process cartridge.

The process cartridge 6 in the image forming apparatus is described in detail below with reference to FIG. 2. As illustrated in FIG. 2, the process cartridge 6 includes the photoconductor drum 1 as an image bearer, the charging roller 4 (a charging device), the developing device 5 to which a developer container 60 is attached to form one unit, and the cleaning device 2.

The photoconductor drum 1 as the image bearer is a negatively-charged organic photoconductor and is driven to rotate clockwise in FIG. 2 by the drive motor disposed in the body of the image forming apparatus 100.

The charging roller 4 (the charging device) is an elastic roller and includes a core and an elastic layer of moderate resistivity, covering the core. For example, the elastic layer is a foamed urethane layer that includes urethane resin, carbon black forming conductive particles, a sulfuration agent, and a foaming agent. The material of the elastic layer of moderate resistivity in the charging roller 4 is, for example, a rubber material in which a conductive substance such as carbon black or a metal oxide for resistance adjustment is dispersed in urethane, ethylene-propylene-diene polyethylene (EPDM), butadiene acrylonitrile rubber (NBR), silicone rubber, or isoprene rubber, or a foamed material thereof. In the present embodiment, the charging roller 4 is configured to be in contact with the photoconductor drum 1, but the charging roller 4 may be configured not to be in contact with the photoconductor drum 1.

The cleaning device 2 includes the cleaning blade 2*a* that slidingly contacts the photoconductor drum 1 and mechanically removes and collects the untransferred toner from the photoconductor drum 1. The cleaning blade 2*a* is made of an elastic material such as urethane rubber and has a substantial plate shape. The cleaning blade 2*a* is pressed against the photoconductor drum 1 with a specified pressure and at a specified angle.

The developing device 5 including the developer container includes a developing roller 51 serving as a developer bearer disposed to contact and press the photoconductor drum 1 with a predetermined pressing force. Thus, a developing region is formed (in a developing nip) between the developing roller 51 and the photoconductor drum 1. In the developing device 5, toner T as a developer (nonmagnetic or magnetic one-component developer) is stored. The developing device 5 develops the electrostatic latent image on the photoconductor drum 1 to form a toner image.

The developing device 5 integrated with the developer container 60 is described in detail below with reference to FIG. 2.

Referring to FIG. 2, the developing device 5 according to the present embodiment is a developing device of a non-contact one-component developing system. The developing device 5, the photoconductor drum 1, the cleaning device 2, and the charging roller 4 form the process cartridge 6, and the process cartridge 6 is detachably attached to (replaceably installed in) the body of the image forming apparatus 100.

The developing device 5 includes a developing roller 51 serving as a developer bearer, a supply roller 52 serving as a developer supply member, a doctor blade 53 serving as a developer restricting member, and a developer container 60 to store toner T (developer). Since the developing device 5 in the present embodiment is integrated with the developer container 60, the developing device serves as the developer container.

The developing roller 51 as the developer bearer is disposed to be in contact with the photoconductor drum 1, bears the toner, and rotates in a predetermined direction (counterclockwise in FIG. 2) to supply the toner to the electrostatic latent image formed on the photoconductor drum 1. The developing roller 51 includes a rotating shaft as a core made of conductive metal such as stainless steel and a roller portion made of elastic material on the rotating shaft.

The supply roller 52 as the developer supply member is disposed so as to be in sliding contact with the developing roller 51 and supplies toner to the developing roller 51. In the supply roller 52, a foamed polyurethane layer having conductivity (e.g., having an electric resistance value of about $10^3\Omega$ to about $10^{14}\Omega$) is laminated on the core. The supply roller 52 also has a function of removing, from the developing roller 51, the toner on the developing roller 51 that has not been consumed by the developing process in the developing region between the developing roller 51 and the photoconductor drum 1.

The doctor blade 53 as the developer restricting member is disposed in a manner such that the tip of the doctor blade 53 contacts the outer peripheral surface of the developing roller 51 at a predetermined angle and presses the outer peripheral surface of the developing roller 51 with a pressure of about 10 N/m to about 100 N/m to level the amount of the toner borne on the developing roller 51. In other words, the doctor blade 53 is brought into contact with the developing roller 51 to form a thin toner layer borne on the developing roller 51. As the doctor blade 53, a thin plate-shaped member made of metal such as stainless steel may be used.

A power source applies a predetermined voltage to each of the developing roller 51, the supply roller 52, and the doctor blade 53 to cause electrostatic movement of the toner on the developing roller 51. In the present embodiment, the power source applies an alternating voltage formed by rectangular waves having an alternating current voltage frequency of about 500 Hz to 1000 Hz, a peak-to-peak voltage of about 500 V to 3000 V, and an application time duty of about 30% to 70% to the developing roller 51 so that the toner reciprocates between the developing roller 51 and the photoconductor drum 1 in the developing region.

The power source in the present embodiment applies the alternating voltage to the developing roller 51, but an image forming apparatus may include a power source to apply a direct current voltage of about −100 V to −500 V to the developing roller 51.

The developer container 60 to store the toner T as the developer includes a stirring paddle 54 as a rotator and an agitator 55 as a developer conveyor to stir and convey the toner T stored inside the developer container 60. Gears are attached to the stirring paddle 54 and the agitator 55 similar to the developing roller 51 and the supply roller 52 and form a gear train including an idler gear. A driving force is input to the gear train from the driving motor as a driving device, and the developing roller 51, the supply roller 52, the stirring paddle 54, and the agitator 55 are driven to rotate in directions indicated by arrows in FIG. 2.

The developer container 60 in the developing device 5 is described in detail below.

The developing device 5 configured as described above operates as follows during a typical developing process.

Initially, a part of the toner stored in the developing device 5 is supplied to the supply roller 52, and the supply roller 52 bears the toner. The toner borne on the supply roller 52 is frictionally charged at a pressure contact portion at a contact position at which the supply roller 52 is pressed against the developing roller 51. The charged toner moves to the developing roller 51, and the developing roller 51 bears the toner. At a position at which the doctor blade 53 abuts on the developing roller 51, the doctor blade 53 frictionally charges the toner borne on the developing roller 51 and forms a uniform thin charged toner layer, and the toner layer reaches the developing region at a position at which the developing roller 51 faces the photoconductor drum 1. At the position, the toner is attracted to the latent image formed on the photoconductor drum 1 by an electric field (a developing electric field) formed in the developing region.

The configuration and operation of the developer container 60, which are characteristic of the developing device 5 in the process cartridge 6 according to the present embodiment, are described in detail below.

Figure 3A:
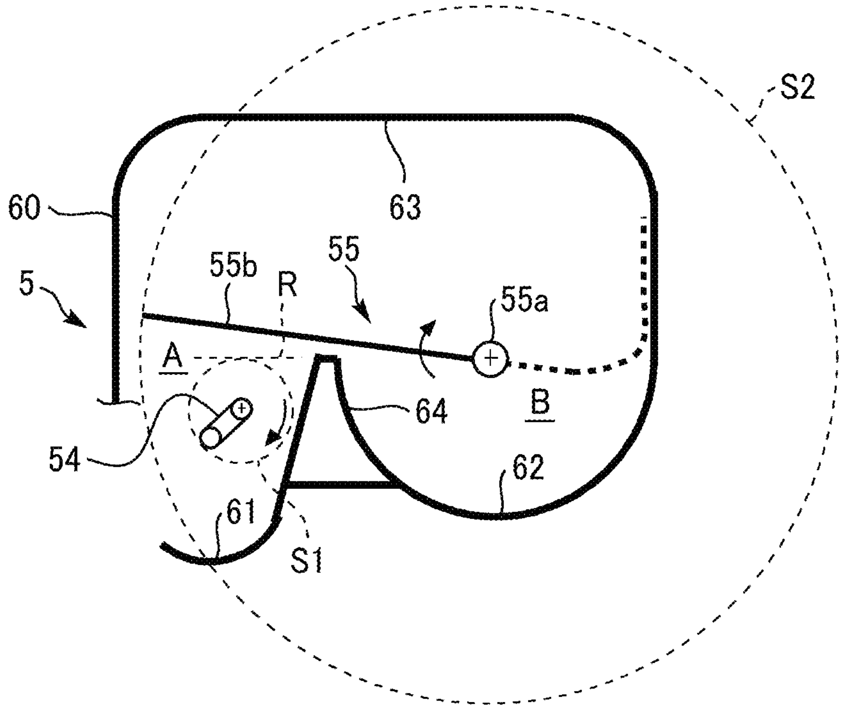
FIGS. 3A and 3B are schematic diagrams illustrating a developer container attached to a developing device.
Figure 3B:
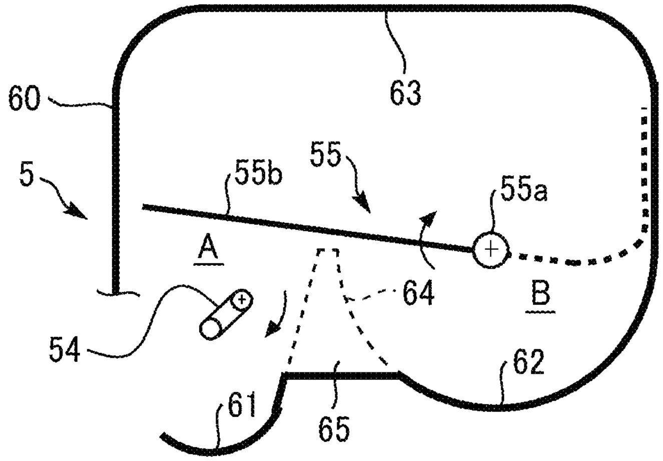

As illustrated in FIGS. 2, 3A, and 3B, the developer container 60 according to the present embodiment has two housings that are a first housing A and a second housing B. In other words, the inside of the developer container 60 is partitioned into two large housings A and B forming two storage spaces.

As a result, the capacity of the above-described developer container 60 can be larger than the capacity of the developer container including the first housing A in which the developing roller 51 and the supply roller 52 are disposed and not including the second housing B. Therefore, the replacement cycle of the developing device 5 (and the process cartridge 6) can be prolonged. In addition, the toner T is less likely to agglomerate in the first housing A described above than in the first housing having simply increased volume.

As illustrated in FIGS. 2, 3A, and 3B, the first housing A has a space extending upward from a main portion of the developing device 5 in which the developing roller 51 and the supply roller 52 are disposed.

The stirring paddle 54 as the rotator is disposed in the first housing A. The stirring paddle 54 rotates in a predetermined direction (clockwise in FIGS. 2, 3A, and 3B) around a rotation center shaft disposed inside a space storing the toner T as the developer. The stirring paddle 54 as the rotator is made of resin or metal and includes one or more blade-shaped members provided on the rotation center shaft. The stirring paddle 54 rotates to draw a first rotation trajectory S1 as indicated by a broken line in FIG. 3A in the first housing A and stirs and conveys the toner T. Since the stirring paddle

54 stirs and conveys the toner T, the toner T in the first housing A is less likely to aggregate, which prevents the occurrence of abnormal images. In addition to the stirring paddle 54, the developing roller 51, the supply roller 52, and the doctor blade 53 as the developer restricting member are also disposed in the first housing A.

In contrast, the second housing B has a space laterally extending from the space of the first housing A and communicates with the space of the first housing A so as to convey the toner T as the developer from the second housing B to the first housing A. Specifically, in the developer container 60, the toner T flows from the second housing B to the first housing A and flows from the first housing A to the second housing B, that is, the toner T reciprocates between the first housing A and the second housing B.

The agitator 55 as the developer conveyor is disposed in the second housing B. The agitator 55 rotates in a predetermined rotational direction (clockwise in FIGS. 2, 3A, and 3B) about a rotation shaft 55*a*.

Specifically, the agitator 55 as the developer conveyor includes the rotation shaft 55*a* made of metal or resin and flexible sheets 55*b* extending from the rotation shaft 55*a* in the radial direction. The flexible sheet 55*b* is a substantially rectangular sheet made of a flexible material such as polyethylene terephthalate (PET) and has a thickness of about 0.08 to 1.5 mm. The root of the flexible sheet 55*b* (in other words, a fixed end of the flexible sheet 55*b*) is joined to the rotation shaft 55*a* by bonding, screwing, or thermal welding.

The flexible sheet 55*b* is designed to have a sufficient length from the root (the fixed end) to the tip (in other words, a free end) so that the tip (the free end) draws a second rotation trajectory S2 not only on the side that is a wall face extending vertically on the right side of the second housing B in FIGS. 2, 3A, and 3B, and a bottom 62 of the second housing B but also in an upper portion of the first housing A.

In particular, the flexible sheet 55*b* is designed to have a portion including the tip (the free end) that is bent and comes into sliding contact with the bottom 62 and the side of the second housing B as indicated by the broken line in FIGS. 2, 3A, and 3B. The above-described flexible sheet 55*b* reduces the possibility that the toner T may stay or adhere on the inner wall face (particularly, the bottom 62 and the side) of the second housing B.

In addition, rotating the agitator 55 agitates and conveys not only the toner T in the second housing B but also the toner T in a part of the first housing A, thereby reducing the trouble of aggregation of the toner T and reducing the occurrence of abnormal images. Further, rotating the agitator 55 enhances the transfer of the toner T from the second housing B to the first housing A.

Figure 4:
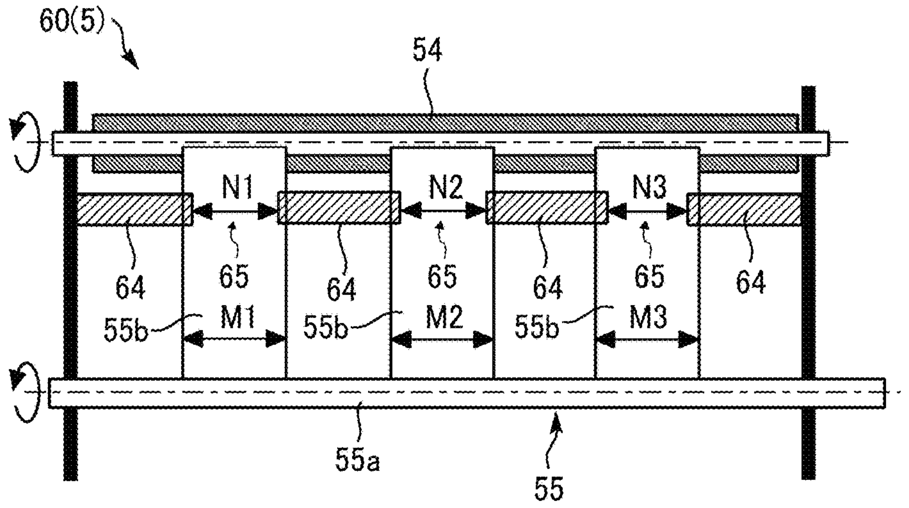
FIG. 4 is a schematic diagram illustrating a positional relationship among flexible sheets of an agitator, partitions, and a paddle.

Referring to FIG. 4, the agitator 55 as the developer conveyor in the present embodiment includes multiple flexible sheets 55*b* (three flexible sheets 55*b* in the example of FIG. 4) disposed on the rotation shaft 55*a* with gaps in the rotation shaft direction (the direction perpendicular to the paper surface of FIGS. 2, 3A, and 3B and the horizontal direction in FIG. 4).

Since the above-described multiple flexible sheets 55*b* separated each other in the rotation shaft direction that is also referred to as a width direction and a longitudinal direction distribute the pressure of the toner T received by the agitator 55, the rotational torque of the agitator 55 including the multiple flexible sheets 55*b* is smaller than the rotational torque of an agitator including one flexible sheet disposed in an entire region in the rotation shaft direction.

The flexible sheet 55*b* of the agitator 55 as the developer conveyor in the present embodiment draws an imaginary rotation trajectory S2 as illustrated in FIG. 3A under an imaginary condition in which the flexible sheet 55*b* does not contact any member (such as an internal wall surface) and does not bend. The imaginary rotation trajectory S2 intersects or overlays the rotation trajectory S1 drawn by the stirring paddle 54 as the rotator that is inside the first housing A. In other words, the agitator 55 is designed such that the two rotation trajectories S1 and S2 illustrated in FIG. 3A overlap each other.

Since the above-described configuration can broaden a range in which the flexible sheets 55*b* of the agitator 55 enter the first housing A, the above-described configuration narrows a dead space in the first housing A in which the toner T as the developer is not stirred by any one of the stirring paddle 54 and the agitator 55.

As a result, the above-described configuration prevents the toner T in the dead space from staying, aggregating, or adhering to the inner surface of the developer container.

Elongating the flexible sheets 55*b* in the present embodiment as described above broadens the range in which the flexible sheets 55*b* of the agitator 55 enter the first housing A and reduces the dead space but causes interference between the flexible sheets 55*b* and the stirring paddle 54. If such interferences occur, the flexible sheets 55*b* and the stirring paddle 54 are damaged and lose their functions.

To prevent the above-described disadvantages, the developer container 60 according to the present embodiment includes multiple partitions 64 as illustrated in FIGS. 3A, 3B, and 4. The multiple partitions 64 are disposed between the first housing A and the second housing B (in other words, a boundary portion between the first housing A and the second housing B) and arranged at intervals 65 (gaps) in the rotation shaft direction.

The multiple partitions 64 (four partitions 64 in the example of FIG. 4) are in contact with the flexible sheets 55*b* so that the flexible sheets 55*b* do not contact the stirring paddle 54 as the rotator. The multiple partitions 64 are between the first housing A and the second housing B and arranged at intervals 65 in the rotation shaft direction (that is a direction perpendicular to the surface of the paper on which FIGS. 3A and 3B are drawn and the horizontal direction in FIG. 4).

The partitions 64 prevent the disadvantage that the flexible sheets 55*b* contact the stirring paddle 54. Providing the multiple partitions 64 separated each other by the intervals 65 in the rotation shaft direction causes the toner T to flow from the intervals 65, which generates the transfer of the toner T between the first housing A and the second housing B. As a result, the lowering of the toner conveyance performance in the developer container 60 can be prevented.

Note that FIG. 3A is a cross-sectional view of the developer container 60 including the partition 64, and FIG. 3B is a cross-sectional view of the developer container 60 at a cross section in the interval 65 (the gap).

Specifically, as illustrated in FIG. 3A, the partitions 64 are integrally (or as separate members) connected to a bottom 61 of the first housing A and the bottom 62 of the second housing B. In other words, the partitions 64 are integrally connected to the bottom 61 of the first housing A and the bottom 62 of the second housing B to form a single component with the first housing A and the second housing B or are detachably attachable as the separate member to a portion between the bottom 61 of the first housing A and the bottom of the second housing B. The partitions 64 are formed so as to rise from the bottoms 61 and 62 to a height equal to or higher than the upper end R of the first rotation trajectory S1 of the stirring paddle 54 as the rotator. In detail, the upper end of each of the partitions 64 in the present embodiment is designed to have a height substantially equal to the upper end R of the first rotation trajectory S1 of the stirring paddle 54 and sufficiently separated downward from a ceiling 63 of each of the first housing A and the second housing B. In addition, the heights of the upper ends of the partitions 64 are designed to be substantially equal to the height of the rotation shaft 55*a* of the agitator 55.

In the above-described configuration, the agitator 55 rotates clockwise in FIGS. 3A and 3B, and the flexible sheet 55*b* is bent and slides in contact with the side, the bottom 62, and the partitions 64 while the tip of the flexible sheet 55*b* moves from the side to the partitions 64 through the bottom 62. Immediately after the tip of the flexible sheet 55*b* passes through the partitions 64, the resilience of the flexible sheet 55*b* returns the flexible sheet 55*b* to the original straight shape (or a nearly straight shape) because the partitions 64 do not restrict the flexible sheet 55*b*. Subsequently, the tip of the flexible sheet 55*b* passes through the ceiling 63 (or the vicinity of the ceiling 63) of the first housing A and the second housing B and returns to the side of the second housing B again.

Accordingly, the long flexible sheets 55*b* do not interfere with the stirring paddle 54. In addition, the above-described structure can lead the tips (the free ends) of the flexible sheets 55*b* to enter the space above the first housing A and the stirring paddle 54 and reduce the toner T staying in the space above the first housing A as described above.

Referring to FIGS. 3A, 3B, and 4, the multiple partitions 64 separated by the intervals 65 (in other words, the gaps) extend from the bottom 61 of the first housing A and the bottom 62 of the second housing B to the top ends of partitions 64. In other words, the multiple partitions 64 form a comb teeth shape when viewed in a cross section extending in the rotation shaft direction and the vertical direction. The above-described configuration forms a sufficient space (in other words, the sufficient gap) between the neighboring partitions 64, increasing the toner T flowing from the intervals 65 as described above.

As described above, the developer container 60 according to the present embodiment in the developing device 5 includes multiple partitions 64 disposed between the first housing A and the second housing B and arranged at intervals 65 in the rotation shaft direction to prevent the flexible sheets 55*b* from interfering with the stirring paddle 54.

The above-described structure is less likely to form a dead space of the toner T in the first housing A and the second housing B, prevents the conveyance performance of the toner T from the second housing B to the first housing A by the agitator 55 from decreasing, and prevents the agitator 55 and the stirring paddle 54 from being damaged.

Referring to FIGS. 2, 3A, and 3B, in the rotation direction of the agitator 55 as the developer conveyor according to the present embodiment, each of the flexible sheets 55*b* in the second housing B rotates from the side of the second housing B that is the side away from the first housing A, passes by the bottom 62, approaches the first housing A, passes by the ceiling 63, and returns to the side away from the first housing A. In other words, the agitator 55 rotates clockwise around the rotation shaft 55*a* in FIG. 2.

The above-described configuration can enhance the toner conveyance performance of the agitator 55 conveying the toner from the second housing B to the first housing A and the function of the partitions 64 preventing the interference between the flexible sheets 55*b* and the stirring paddle 54.

Referring to FIG. 4, two adjacent partitions 64 arranged in the rotation shaft direction to form the interval 65 (in other words, the gap) in the present embodiment are positioned to face the flexible sheet 55*b*. Specifically, in FIG. 4, the leftmost flexible sheet 55*b* is disposed to face the interval 65 between the leftmost partition 64 and the partition 64 adjacent to the leftmost partition 64. The flexible sheet 55*b* located at the center of the agitator 55 is disposed so as to face the interval 65 between the two partitions 64 located at the center of the developer container 60. The rightmost flexible sheet 55*b* is disposed so as to face the interval 65 between the rightmost partition 64 and the partition 64 adjacent to the rightmost partition 64.

The widths M1 to M3 of the flexible sheets 55*b* are larger than the distances N1 to N3 of the intervals 65 in the rotation shaft direction, respectively (that is, M1>N1, M2>N2, and M3>N3). In other words, both ends of the flexible sheet 55*b* come into contact with partitions 64 neighboring in the rotation shaft direction, respectively.

Due to the above-described configuration, the flexible sheets 55*b* of the agitator 55 can enhance the flow of the toner between the first housing A and the second housing B via the interval 65, while the partitions 64 maintain the above-described function that prevents the interference between the flexible sheets 55*b* and the stirring paddle 54.

Note that the widths M1 to M3 of the multiple flexible sheets 55*b* may not be equal to each other, and accordingly, the distances N1 to N3 of the intervals 65 may not be equal to each other.

In the present embodiment, the partitions 64 are formed integrally with the housing (in other words, the case) of the developer container 60 of the developing device 5 as a single component to reduce the number of components and the cost. However, the partitions 64 may be made as components different from the housing and configured to be attachable to and detachable from the housing. In such a case, the partitions 64 having different shapes may be made to exchange the partitions 64 in the market, which increases the degree of freedom in dealing with the machines in the market.

The following describes a first modification of the present embodiment.

Figure 5A:
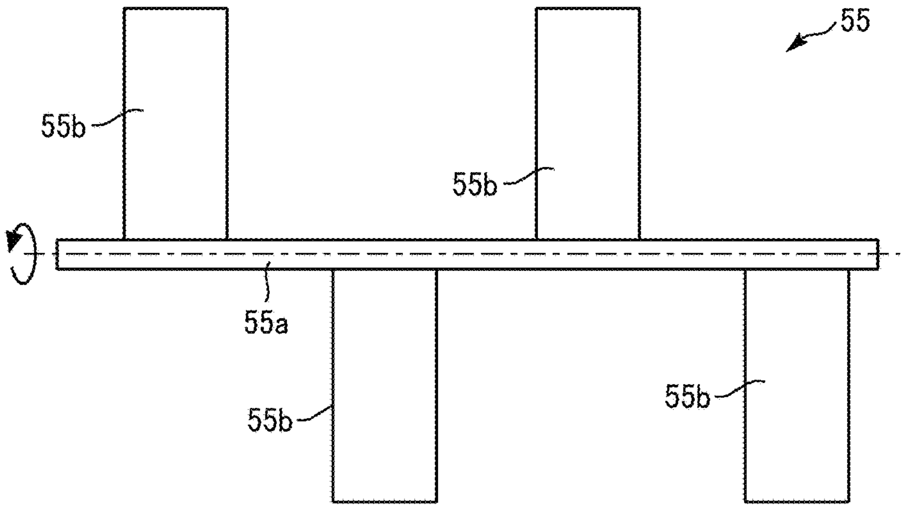
FIGS. 5A and 5B are schematic views of agitators according to a first modification.

As illustrated in FIG. 5A, the agitator 55 of the developer container 60 in the developing device 5 according to the first modification includes multiple flexible sheets 55*b* disposed on the rotation shaft 55*a* so that the flexible sheets 55*b* extend separately in at least two different radial directions (in the example of FIG. 5A, two radial directions whose phases are shifted by 180°).

The above-described configuration can disperse the resistance received from the toner T during one rotation of the agitator 55. As a result, the above-described configuration can reduce the rotational torque of the agitator 55 and the variation in the rotational torque.

Figure 5B:
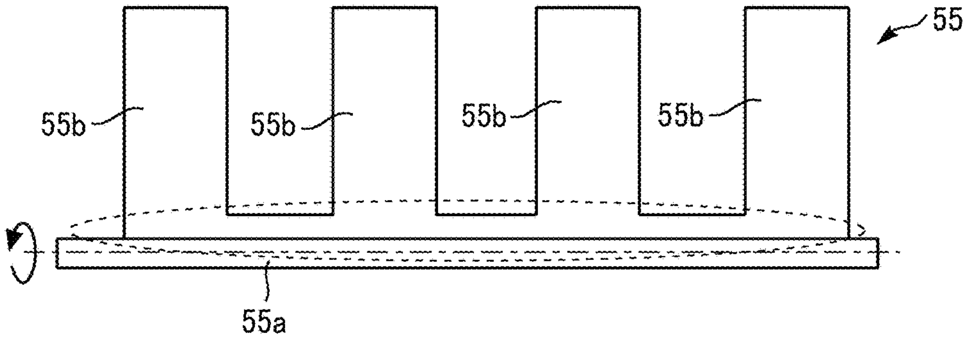

The agitator 55 illustrated in FIG. 5B includes a flexible sheet 55*b* having multiple flexible sheet portions and the common root portion that is integrally connected, joined to the rotation shaft 55*a*, and surrounded by a broken line in FIG. 5B.

The above-described configuration including the multiple flexible sheet portions that can be integrated as one component simplifies a work to set the multiple flexible sheets 55*b* to the rotation shaft 55*a* and dimensional management.

The following describes a second modification of the present embodiment.

Figure 6:
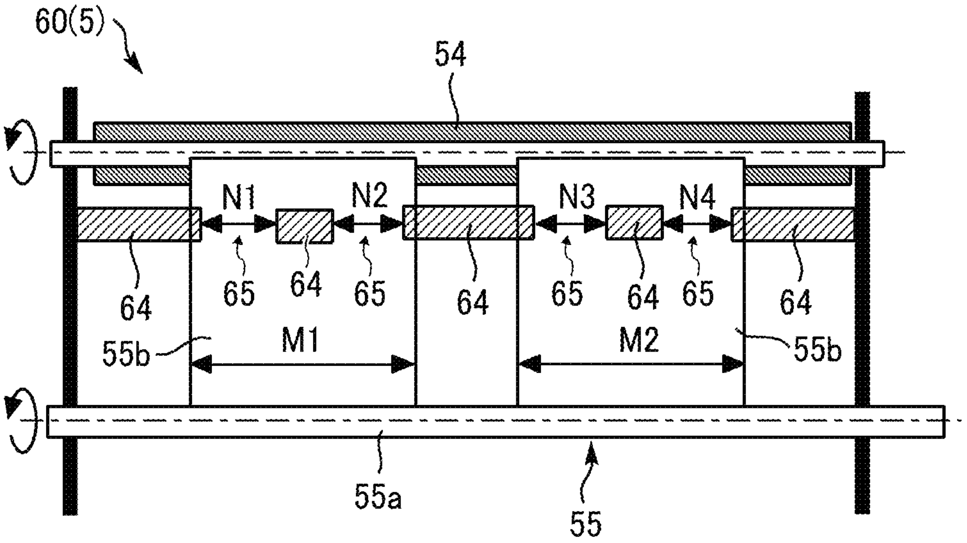
FIG. 6 is a schematic diagram illustrating a positional relationship among flexible sheets of an agitator, partitions, and a paddle in a second modification.

As illustrated in FIG. 6, the flexible sheet 55*b* of the agitator 55 in the developer container 60 (the developing device 5) according to the second modification faces at least three partitions 64 and at least two intervals 65 within the range of the length in the rotation shaft direction.

Specifically, each of the two flexible sheets 55*b* in the example of FIG. 6 has the center and both ends in a width direction of the flexible sheet 55*b* (in other words, in the rotation shaft direction). Each of the ends faces a part of each of the two partitions 64, and the center faces a partition 64 shorter than each of the two partitions 64. In other words, the flexible sheet 55*b* has a width in the rotation shaft direction to contact at least three of the multiple partitions 64. The widths M1 and M2 of the flexible sheets 55*b* and the lengths N1 to N4 of the intervals 65 satisfy following relations.

$$M1>N1+N2 \cdot M2>N3+N4.$$

The flexible sheet 55*b* having the center in the width direction configured to contact at least one partition 64 as described above can enhance the function of the partitions 64 preventing the interference between the flexible sheets 55*b* and the stirring paddle 54. In particular, the above-described configuration prevents disadvantage that the flexible sheet 55*b* is deformed and enters the interval 65.

The following describes a third modification.

Figure 7:
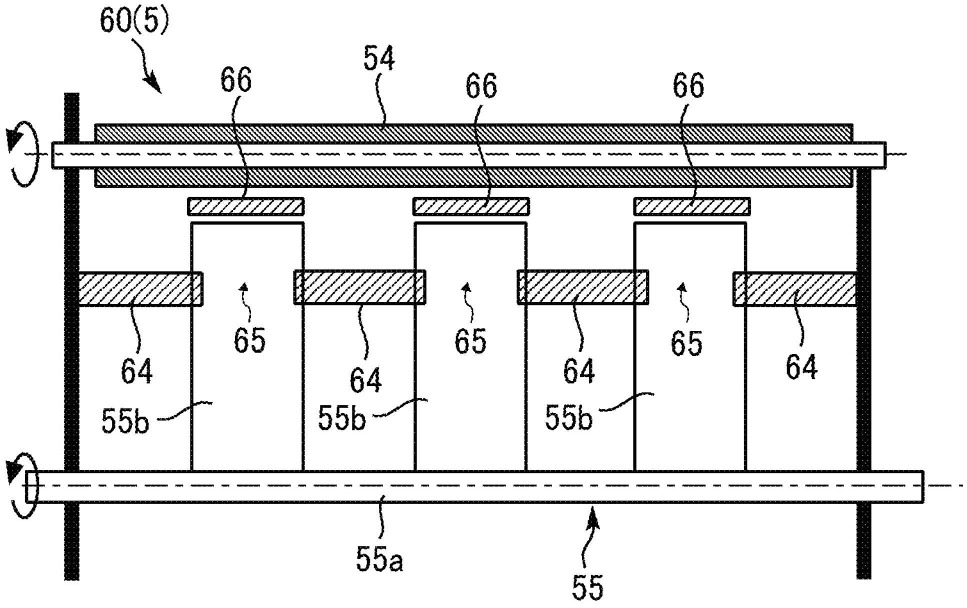
FIG. 7 is a schematic diagram illustrating a positional relationship among flexible sheets of an agitator, partitions, and a paddle in a third modification.

As illustrated in FIG. 7, the developer container 60 (the developing device 5) according to the third modification includes second partitions 66 different from the partitions 64 as first partitions.

The second partition 66 is disposed closer to the stirring paddle 54 in the first housing A than the partition 64 as the first partition. In the rotation shaft direction, the second partition 66 is disposed at a position at which the interval 65 (in other words, the gap) is formed. The second partition 66 is configured to be able to contact the flexible sheet 55*b* to prevent the flexible sheet 55*b* from contacting the stirring paddle 54 and is disposed not to contact the stirring paddle 54. In other words, the second partition 66 as another partition is disposed away from the stirring paddle 54 as the rotator in the first housing A not to contact the stirring paddle 54, disposed at the position of one of the intervals in the rotation shaft direction, and arranged to contact the flexible sheet 55*b* to prevent the flexible sheet 55*b* from contacting the stirring paddle 54.

The second partitions 66 disposed as described above prevent disadvantage that the flexible sheet 55*b* deformed passes through the interval 65 and interferes with the stirring paddles 54.

The following describes a fourth modification.

Figure 8:
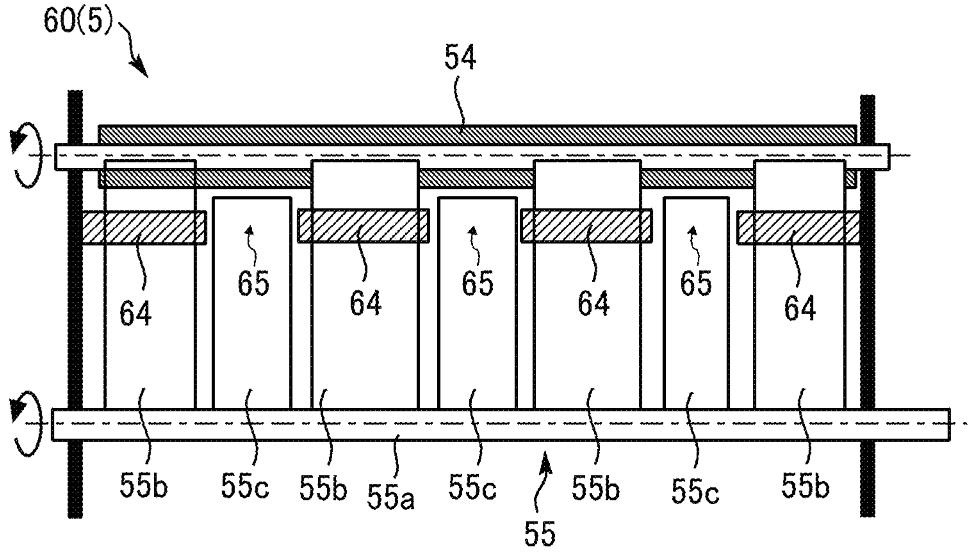
FIG. 8 is a schematic diagram illustrating a positional relationship among flexible sheets of an agitator, partitions, and a paddle in a fourth modification.

As illustrated in FIG. 8, the agitator 55 of the developer container 60 in the developing device 5 according to the fourth modification includes second flexible sheets 55*c* disposed on the rotation shaft 55*a* in addition to the flexible sheets 55*b* as first flexible sheets.

Specifically, the flexible sheet 55*b* as the first flexible sheet is disposed at a position in the rotation shaft direction to face at least one of the partitions 64.

In contrast, the second flexible sheet 55*c* is disposed at a position in the rotation shaft direction to face the interval 65 (in other words, the gap) between the partitions 64. The second flexible sheet 55*c* draws an imaginary rotation trajectory corresponding to the imaginary rotation trajectory S2 in FIG. 3A under an imaginary condition that the flexible sheet 55*c* does not contact any member and does not bend. The second flexible sheet 55*c* is designed so that the imaginary rotation trajectory of the second flexible sheet 55*c* does not intersect (in other words, overlap) the rotation trajectory drawn by the stirring paddle 54 as the rotator. Specifically, the length of the first flexible sheet 55*b* from the fixed end (that is the rotation shaft 55*a*) to the free end (the tip) is designed to be longer than the distance from the rotation shaft 55*a* to the stirring paddles 54. In contrast, the length of the second flexible sheet 55*c* from the fixed end (that is the rotation shaft 55*a*) to the free end (the tip) is designed to be shorter than the distance from the rotation shaft 55*a* to the stirring paddles 54.

The second flexible sheet 55*c* configured as described above is disposed in the interval 65 (in other words, the gap) between the partitions 64 but does not interfere with the stirring paddles 54. Due to the second flexible sheets 55*c* disposed as described above, the agitator 55 can enhance the flow of the toner between the first housing A and the second housing B via the interval 65.

The following describes a fifth modification.

Figure 9:
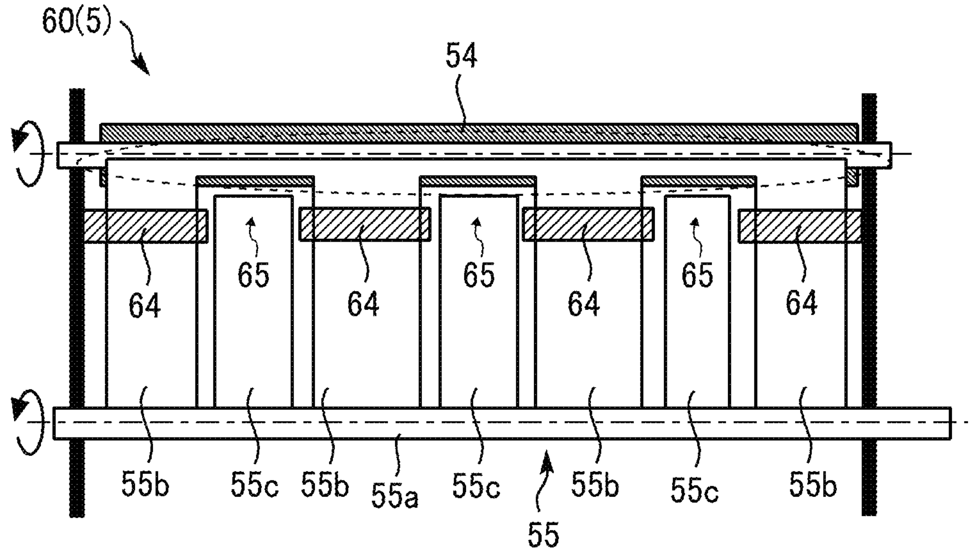
FIG. 9 is a schematic diagram illustrating a positional relationship among flexible sheets of an agitator, partitions, and a paddle in a fifth modification.

As illustrated in FIG. 9, the developer container 60 of the developing device 5 in the fifth modification includes the flexible sheet 55*b* as the first flexible sheet and the second flexible sheets 55*c* that are disposed on the agitator 55 similar to the developer container in FIG. 8. The flexible sheet 55*b* has multiple flexible sheet portions as the first flexible sheets, and the flexible sheet portions and the second flexible sheets 55*c* are alternately arranged in the rotation shaft direction. In other words, the second flexible sheet 55*c* is between adjacent flexible sheet portions.

The flexible sheet 55*b* as the first flexible sheet in the agitator 55 according to the fifth modification as illustrated in FIG. 9 has the multiple flexible sheet portions and an integrally connected tip (that is a free end surrounded by a dashed line in FIG. 9) away from the rotation shaft 55*a*.

Due to the above-described configuration, since the second flexible sheets 55*c* can easily follow the rotation of the first flexible sheet 55*b*, the agitator 55 can enhance the flow of the toner between the first housing A and the second housing B via the interval 65. In addition, the above-described configuration can enhance the toner conveyance performance and the toner stirring performance by the first flexible sheet 55*b*.

The following describes a sixth modification.

Figure 10:
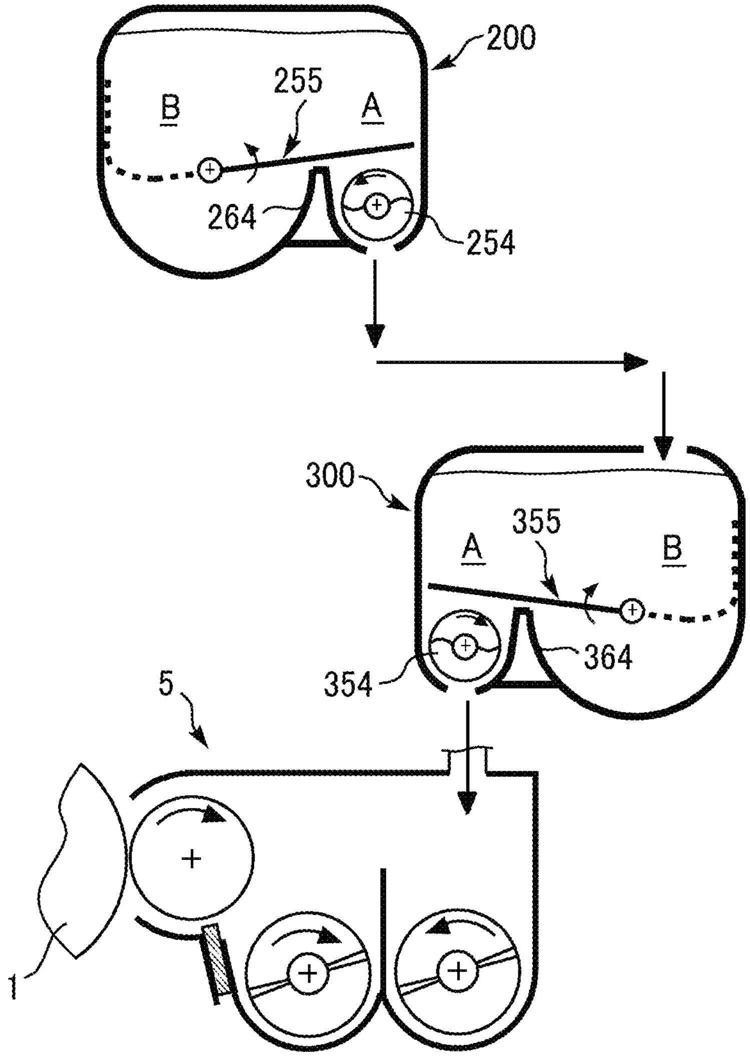
FIG. 10 is a schematic diagram of a toner container, a sub-hopper, and a developing device in a sixth modification.

FIG. 10 is a schematic diagram of a toner container 200, a sub-hopper 300, and the developing device 5 that are parts of the image forming apparatus 100 in the sixth modification.

The toner container 200 (in other words, a toner cartridge) illustrated in FIG. 10 stores the toner T inside and is detachably (replaceably) installed in the image forming apparatus 100. After the toner stored in the toner container 200 is depleted, the toner container 200 is replaced with a new toner container. The toner container 200 supplies the toner T stored therein to the developing device 5 via the sub-hopper 300.

The sub-hopper 300 is fixedly installed in the body of the image forming apparatus 100, stores the toner T (in other words, the developer) supplied from the toner container 200, and supplies the stored toner T to the developing device 5. The toner T stored in the toner container 200 is conveyed to the developing device 5 as indicated by arrows in FIG. 10.

In the sixth modification, the toner container 200 is integrated with the developer container described above with reference to FIGS. 3A to 4 (or FIGS. 5 to 9) and can be referred to as the toner container serving as the developer container. In other words, the toner container 200 includes two housings that are the first housing A and the second housing B, a toner supply screw 254 as the rotator in the first housing A, and an agitator 255 as the developer conveyor in the second housing B. The toner supply screw 254 has a shaft and a screw portion spirally wound around the shaft and ejects the toner to the outside of the toner container 200. The agitator 255 is configured similarly to the agitator 55 in FIG. 3. In addition, multiple partitions 264 are disposed between the first housing A and the second housing B and arranged at intervals in the rotation shaft direction. The configuration of the partitions 264 is substantially the same as that illustrated in FIGS. 3A, 3B, and 4.

The above-described structure is less likely to form a dead space of the toner T in the toner container 200, prevents the conveyance performance of the toner T by the agitator 255 from decreasing, and prevents the agitator 255 and the toner supply screw 254 from being damaged.

In the sixth modification, the sub-hopper 300 is integrated with the developer container described above with reference to FIGS. 3A to 4 (or FIGS. 5 to 9) and can be referred to as the sub-hopper serving as the developer container. In other words, the sub-hopper 300 includes two housings that are the first housing A and the second housing B, a toner supply screw 354 as the rotator in the first housing A, and an agitator 355 as the developer conveyor in the second housing B. The toner supply screw 354 has a shaft and a screw portion spirally wound around the shaft and ejects the toner to the outside of the sub-hopper. The agitator 355 is configured similar to the agitator 55 in FIG. 3. In addition, multiple partitions 364 are disposed between the first housing A and the second housing B and arranged at intervals in the rotation shaft direction. The configuration of the partitions 364 is substantially the same as that illustrated in FIGS. 3A, 3B, and 4.

The above-described structure is less likely to form a dead space of the toner T in the sub-hopper 300, prevents the conveyance performance of the toner T by the agitator 355 from decreasing, and prevents the agitator 355 and the toner supply screw 354 from being damaged.

In the example of FIG. 10, the developing device 5 stores a two-component developer containing toner T and carrier.

As described above, the developer container 60 (the developing device 5) in the present embodiment includes the first housing A to store the toner T (in other words, the developer), the stirring paddle 54 as the rotator rotating in the predetermined direction and disposed inside the toner T stored in the first housing A, the second housing B to store the toner T (the developer), and the agitator 55 as the developer conveyor disposed in the second housing B. The agitator 55 rotates in a predetermined direction about the rotation shaft 55*a* to convey the toner T stored in the second housing B to the first housing A. The agitator 55 includes the rotation shaft 55*a* and the flexible sheets 55*b* extending from the rotation shaft 55*a* in the radial direction. The flexible sheet 55*b* draws the imaginary rotation trajectory S2 under the imaginary condition in which the flexible sheet 55*b* is not in contact with any member and does not bend. The flexible sheet 55*b* is designed so that the imaginary rotation trajectory S2 overlaps at least a part of the rotation trajectory S1 drawn by the stirring paddle 54 disposed inside the first housing A. In addition, the multiple partitions 64 are disposed between the first housing A and the second housing B and arranged at intervals 65 in the rotation shaft direction. The partition 64 contacts the flexible sheets 55*b* such that the flexible sheets 55*b* do not contact the stirring paddle 54.

The above-described structure is less likely to form a dead space of the toner T, prevents the conveyance performance of the toner T by the agitator 55 from decreasing, and prevents the agitator 55 and the stirring paddle 54 from being damaged.

In the above-described embodiments, the present disclosure is applied to the process cartridge 6 as a single unit including the photoconductor drum 1 serving as an image bearer, the charging roller 4, the developing device 5 serving as the developer container, and the cleaning device 2. The present disclosure is not limited to the embodiments described above and can be applied to the developing device 5 configured to be detachably attached as a single unit to the body of the image forming apparatus 100. In such configurations, similar effects to the embodiments described above are also attained.

Note that the term "process cartridge" used in the present disclosure means a detachable unit including an image bearer and at least one of a charging device to charge the image bearer, a developing device to develop a latent image on the image bearer, and a cleaning device to clean the image bearer that are united together and is removably attached as a single unit in the body of the image forming apparatus.

In the present embodiments, the present disclosure is applied to the developing device 5 as the developer container of a contact type one-component developing system in which the developing roller 51 abuts on the photoconductor drum 1 without a gap. However, the present disclosure is also applicable to a developing device of a non-contact type one-component developing system in which a developing roller is opposed to a photoconductor drum with a gap therebetween.

In the present embodiments, the present disclosure is applied to the developing device 5 storing one component developer composed of the toner T. However, the present disclosure is also applicable to a developing device (for example, the developing device 5 illustrated in FIG. 10) that contains two-component developer containing the toner T and carrier. In this case, the developer container 60 contains two-component developer, that is, the carrier in addition to the toner.

Such cases also provide substantially the same effects as the effects described above.

In the present embodiments, the present disclosure is applied to the monochrome image forming apparatus 100 including one image forming unit (that is, the process cartridge 6) that forms the toner image to be transferred onto the sheet P. However, the present disclosure is also applicable to a color image forming apparatus including multiple image forming units and an intermediate transferor such as an intermediate transfer belt. In the color image forming apparatus, multiple image forming units form toner images, the toner images are primarily transferred to the intermediate transferor to form a full-color toner image, and the full-color toner image is secondarily transferred from the intermediate transferor to the sheet.

In the present embodiments, the flexible sheet 55*b* is directly attached to the rotation shaft 55*a*, but the flexible sheet 55*b* may be indirectly assembled to the rotation shaft 55*a* via another member. In the specification of the present application, "the flexible sheet is disposed on the rotation shaft." is defined as structures including above cases.

Such cases also provide substantially the same effects as the effects described above.

Note that embodiments of the present disclosure are not limited to the above-described embodiments, and it is apparent that the above-described embodiments can be appropriately modified within the scope of the technical idea of the present disclosure in addition to what is suggested in the above-described embodiments. Further, features of components of the embodiments, such as the number, the position, and the shape are not limited to the embodiments and thus may be preferably set.

Note that aspects of the present disclosure may be applicable to, for example, combinations of first to seventeenth aspects as follows.

First Aspect

In a first aspect, a developer container includes a first housing, a rotator, a second housing, a developer conveyor, and multiple partitions. The first housing stores developer. The rotator is rotatable to draw a first rotation trajectory in the first housing. The second housing stores the developer and communicates with the first housing. The developer conveyor is in the second housing to convey the developer from the second housing to the first housing. The developer conveyor includes a rotation shaft and a flexible sheet extending from the rotation shaft in a radial direction. The developer conveyor is rotatable about the rotation shaft to draw an imaginary second rotation trajectory. The imaginary second rotation trajectory overlaps at least a part of the first rotation trajectory under an imaginary condition in which the flexible sheet does not contact any member and does not bend. The multiple partitions are disposed between the first housing and the second housing and arranged at intervals in a rotation shaft direction. The multiple partitions are contactable by the flexible sheet rotating around the rotation shaft.

Second Aspect

In a second aspect, the multiple partitions in the developer container according to the first aspect are integrally connected to a bottom of the first housing and a bottom of the second housing to form a single component with the first housing and the second housing or are detachably attachable as a separate member to a portion between the bottom of the first housing and the bottom of the second housing. A height from the bottom of the first housing to a top of each of the multiple partitions is equal to or greater than a height from the bottom of the first housing to a top of the first rotation trajectory of the rotator.

Third Aspect

In a third aspect, the developer container according to the first aspect or the second aspect further includes multiple flexible sheets including the flexible sheet, and the multiple flexible sheets are arranged at intervals on the rotation shaft in the rotation shaft direction.

Fourth Aspect

In a fourth aspect, the multiple flexible sheets in the developer container according to the third aspect extend separately in at least two different radial directions.

Fifth Aspect

In a fifth aspect, the flexible sheet in the developer container according to the third aspect or the fourth aspect has a root joined to the rotation shaft and multiple flexible sheet portions arranged at intervals in the rotation shaft direction.

Sixth Aspect

In a sixth aspect, a width of the flexible sheet in the rotation shaft direction in the developer container according to any one of the first to fifth aspects is larger than an interval between adjacent partitions of the multiple partitions, and the adjacent partitions is contactable with both ends of the flexible sheet in the rotation shaft direction.

Seventh Aspect

In a seventh aspect, the flexible sheet in the developer container according to any one of the first to sixth aspects has a width in the rotation shaft direction to contact at least three of the multiple partitions.

Eighth Aspect

In an eighth aspect, the developer container according to any one of the first to seventh aspects further includes another partition disposed away from the rotator in the first housing not to contact the rotator, disposed at a position of one of the intervals in the rotation shaft direction, and arranged to contact the flexible sheet.

Ninth Aspect

In a ninth aspect, the developer container according to any one of the first to eighth aspects further includes another flexible sheet disposed at a position of one of the intervals in the rotation shaft direction on the rotation shaft, and the flexible sheet is disposed on the rotation shaft to face at least one of the multiple partitions. Said another flexible sheet draws an imaginary rotation trajectory not overlapping the first rotation trajectory of the rotator under an imaginary condition that said another flexible sheet does not contact any member and does not bend.

Tenth Aspect

In a tenth aspect, the flexible sheet in the developer container according to the ninth aspect has a tip and multiple flexible sheet portions extending from the tip to the rotation shaft, and said another flexible sheet is between adjacent flexible sheet portions of the multiple flexible sheet portions.

Eleventh Aspect

In an eleventh aspect, the developer conveyor in the developer container according to any one of the first to tenth aspects rotates such that a tip of the flexible sheet moves from a side of the second housing away from the first housing, passes through a bottom of the second housing, approaches the first housing, passes by a ceiling of the second housing, and returns to the side of the second housing away from the first housing again.

Twelfth Aspect

In a twelfth aspect, a developing device includes the developer container according to any one of the first to eleventh aspects.

Thirteenth Aspect

In a thirteenth aspect, the developing device according to the twelfth aspect further includes a developing roller, a supply roller to supply developer to the developing roller, and a doctor blade to level an amount of the developer supplied to the developing roller, and the developing roller, the supply roller, and the doctor blade are disposed in the first housing.

Fourteenth Aspect

In a fourteenth aspect, a process cartridge includes a developing device according to the thirteenth aspect.

Fifteenth Aspect

In a fifteenth aspect, a toner container includes the developer container according to any one of the first to eleventh aspects.

Sixteenth Aspect

In a sixteenth aspect, a sub-hopper to store developer supplied to a toner container and supply the developer to a developing device includes the developer container according to any one of the first to eleventh aspects.

Seventeenth Aspect

In a seventeenth aspect, an image forming apparatus includes one of the developer container according to any one of the first to eleventh aspects, the developing device according to one of the twelfth aspect and the thirteenth aspect, the process cartridge according to the fourteenth aspect, the toner container according to the fifteenth aspect, and the sub-hopper according to the sixteenth aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A developer container comprising:
- a first housing to store developer;
- a rotator rotatable to draw an imaginary first rotation trajectory in the first housing;
- a second housing to store the developer, the second housing communicating with the first housing;
- a developer conveyor in the second housing to convey the developer from the second housing to the first housing, the developer conveyor including:
- a rotation shaft; and
- a flexible sheet extending from the rotation shaft in a radial direction, and
- the developer conveyor rotatable about the rotation shaft to draw an imaginary second rotation trajectory, the imaginary second rotation trajectory overlapping at least a part of the imaginary first rotation trajectory under an imaginary condition in which the flexible sheet does not contact any member and does not bend; and
- multiple partitions disposed between the first housing and the second housing and arranged at intervals in a rotation shaft direction,
- wherein:
- the multiple partitions are contactable by the flexible sheet rotating around the rotation shaft,
- the multiple partitions are integrally connected to a bottom of the first housing and a bottom of the second housing to form a single component with the first housing and the second housing, and
- a height from the bottom of the first housing to a top of each of the multiple partitions is equal to or greater than a height from the bottom of the first housing to a top of the imaginary first rotation trajectory of the rotator.

2. A developer container, comprising:
- a first housing to store developer;
- a rotator rotatable to draw an imaginary first rotation trajectory in the first housing;
- a second housing to store the developer, the second housing communicating with the first housing;
- a developer conveyor in the second housing to convey the developer from the second housing to the first housing, the developer conveyor including:
- a rotation shaft; and
- a flexible sheet extending from the rotation shaft in a radial direction, and
- the developer conveyor rotatable about the rotation shaft to draw an imaginary second rotation trajectory, the imaginary second rotation trajectory overlapping at least a part of the imaginary first rotation trajectory under an imaginary condition in which the flexible sheet does not contact any member and does not bend; and
- multiple partitions disposed between the first housing and the second housing and arranged at intervals in a rotation shaft direction,
- wherein:
- the multiple partitions are contactable by the flexible sheet rotating around the rotation shaft,
- the multiple partitions are components different from the first housing and the second housing and disposed between a bottom of the first housing and a bottom of the second housing, and
- a height from a bottom of the first housing to a top of each of the multiple partitions is equal to or greater than a height from the bottom of the first housing to a top of the imaginary first rotation trajectory of the rotator.

3. The developer container according to claim 1, further comprising:
- multiple flexible sheets including the flexible sheet,
- the multiple flexible sheets arranged at intervals on the rotation shaft in the rotation shaft direction.

4. A developer container, comprising:
- a first housing to store developer;
- a rotator rotatable to draw an imaginary first rotation trajectory in the first housing;
- a second housing to store the developer, the second housing communicating with the first housing;
- a developer conveyor in the second housing to convey the developer from the second housing to the first housing, the developer conveyor including:
- a rotation shaft; and
- a flexible sheet extending from the rotation shaft in a radial direction, and
- the developer conveyor rotatable about the rotation shaft to draw an imaginary second rotation trajectory, the imaginary second rotation trajectory overlapping at least a part of the imaginary first rotation trajectory under an imaginary condition in which the flexible sheet does not contact any member and does not bend; and
- multiple partitions disposed between the first housing and the second housing and arranged at intervals in a rotation shaft direction, wherein:

the multiple partitions are contactable by the flexible sheet rotating around the rotation shaft, the developer container further comprises multiple flexible sheets including the flexible sheet, the multiple flexible sheets disposed at intervals on the rotation shaft in the rotation shaft direction, and the multiple flexible sheets extend separately in at least two different radial directions.

5. The developer container according to claim 3, wherein:

the multiple flexible sheets extend separately in at least two different radial directions.

6. The developer container according to claim 1, wherein the flexible sheet includes:

a root joined to the rotation shaft; and multiple flexible sheet portions arranged at intervals in the rotation shaft direction.

7. The developer container according to claim 1, wherein;

a width of the flexible sheet in the rotation shaft direction is larger than an interval between adjacent partitions of the multiple partitions, the adjacent partitions contactable with both ends of the flexible sheet in the rotation shaft direction.

8. The developer container according to claim 1, wherein;

the flexible sheet has a width in the rotation shaft direction to contact at least three of the multiple partitions.

9. The developer container according to claim 1, further comprising:

another partition disposed away from the rotator in the first housing not to contact the rotator, disposed at a position of one of the intervals in the rotation shaft direction, and arranged to contact the flexible sheet.

10. The developer container according to claim 1, further comprising:

another flexible sheet disposed at a position of one of the intervals in the rotation shaft direction on the rotation shaft, wherein the flexible sheet is disposed on the rotation shaft to face at least one of the multiple partitions, and said another flexible sheet draws an imaginary rotation trajectory not overlapping the imaginary first rotation trajectory of the rotator under an imaginary condition that said another flexible sheet does not contact any member and does not bend.

11. The developer container according to claim 10, wherein:

the flexible sheet has a tip and multiple flexible sheet portions extending from the tip to the rotation shaft, and said another flexible sheet is between adjacent flexible sheet portions of the multiple flexible sheet portions.

12. The developer container according to claim 1, wherein:

the developer conveyor rotates such that a tip of the flexible sheet moves from a side of the second housing away from the first housing, passes through a bottom of the second housing, approaches the first housing, passes by a ceiling of the second housing, and returns to the side of the second housing away from the first housing again.

13. A developing device comprising:

the developer container according to claim 1.

14. The developing device according to claim 13, further comprising:

a developing roller;

a supply roller to supply developer to the developing roller; and a doctor blade to level an amount of the developer supplied to the developing roller, wherein the developing roller, the supply roller, and the doctor blade are disposed in the first housing.

15. A process cartridge comprising:

the developing device according to claim 13.

16. A toner container comprising:

the developer container according to claim 1.

17. A sub-hopper to store developer supplied to a toner container and supply the developer to a developing device, comprising:

the developer container according to claim 1.

18. An image forming apparatus comprising:

the developer container according to claim 1.

19. The developer container according to claim 1, wherein:

the multiple partitions are components different from the first housing and the second housing and disposed between a bottom of the first housing and a bottom of the second housing, and a height from a bottom of the first housing to a top of each of the multiple partitions is equal to or greater than a height from the bottom of the first housing to a top of the first rotation trajectory of the rotator.

20. The developer container according to claim 1, further comprising:

multiple flexible sheets including the flexible sheet, the multiple flexible sheets extending separately in at least two different radial directions.

* * * * *